Figure 1:
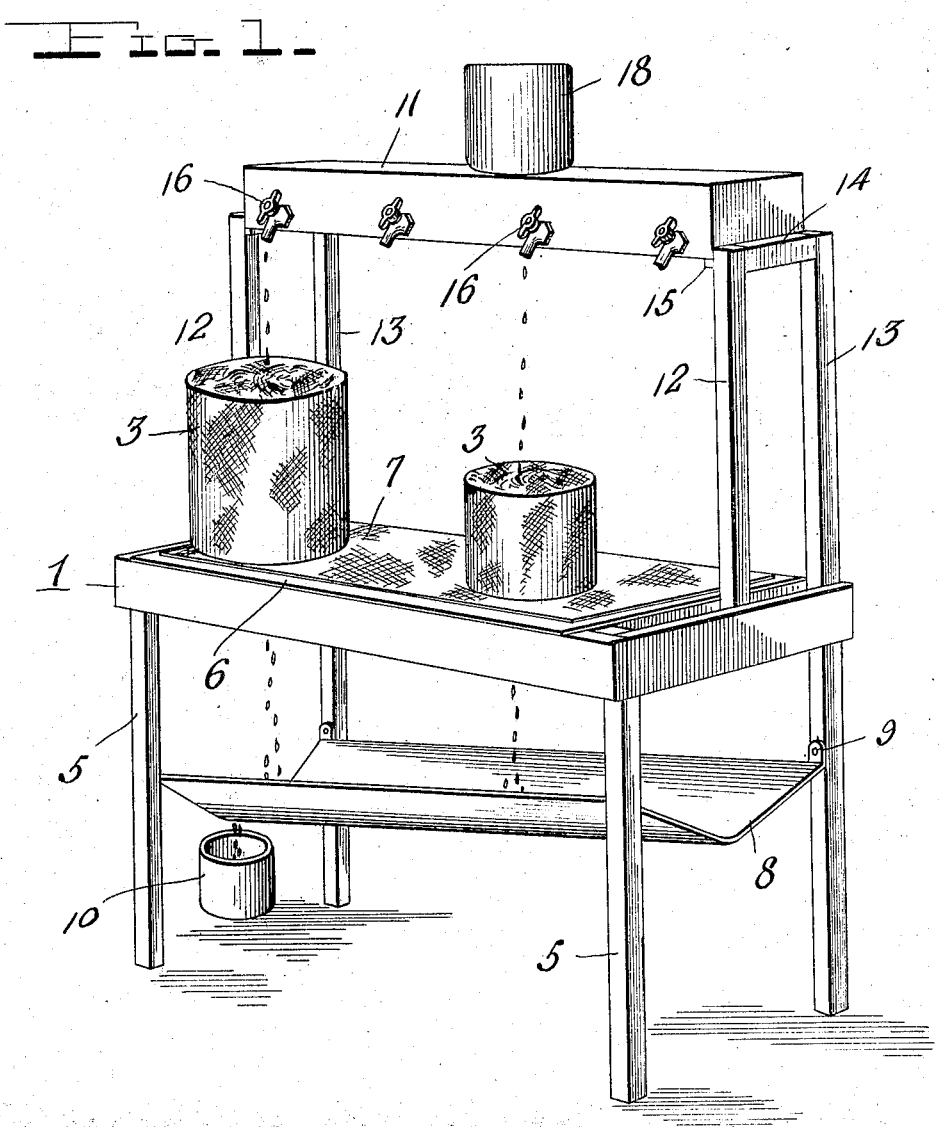

T. E. DICKSON.
MILK COOLER.
APPLICATION FILED APR. 29, 1909.

930,358.

Patented Aug. 10, 1909.
2 SHEETS—SHEET 1.

Witnesses
Chas. L. Griesbauer.
E. M. Ricketts

Inventor
T. E. Dickson
By Watson E. Coleman
Attorney

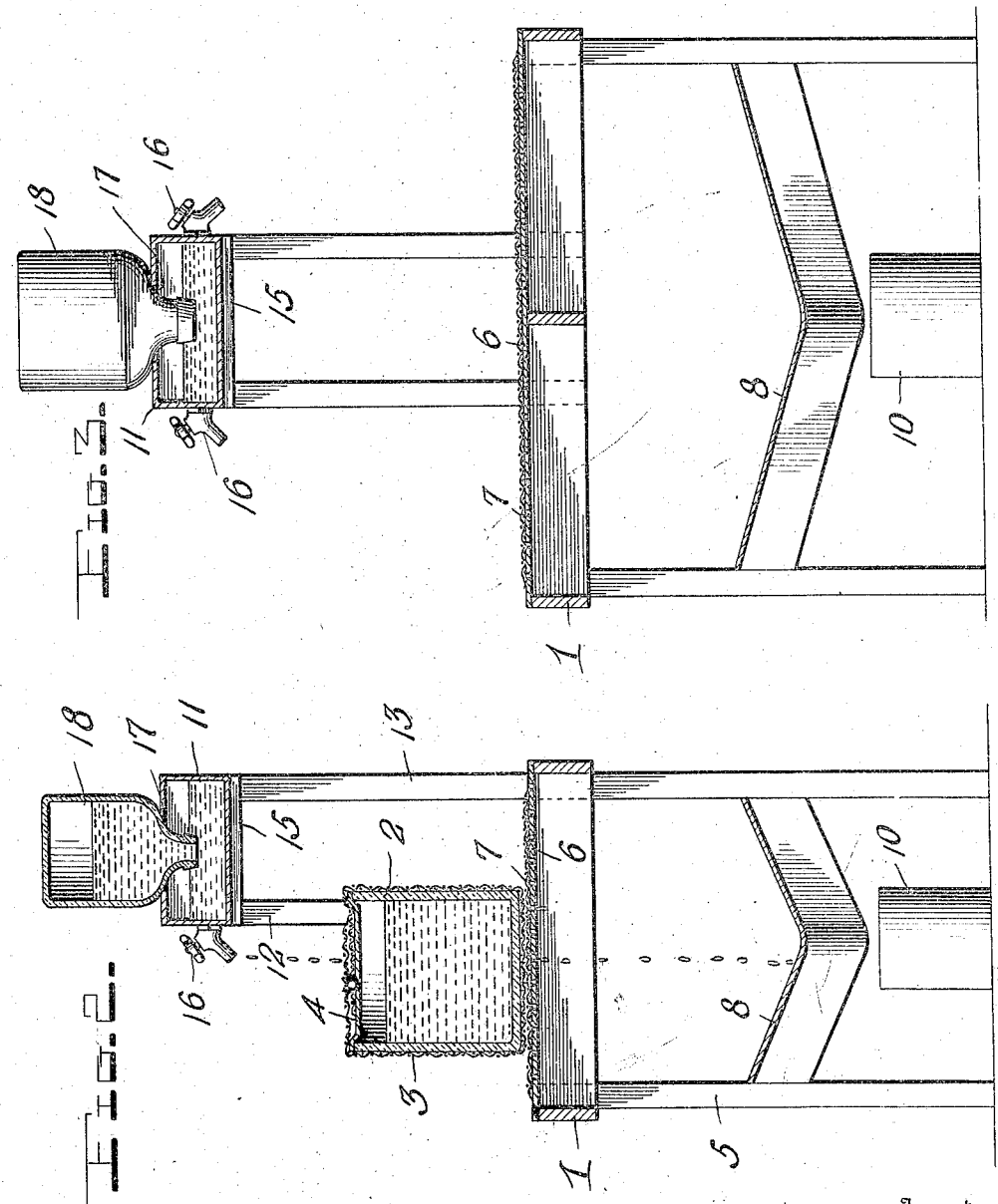

UNITED STATES PATENT OFFICE.

TOMAS EDWARD DICKSON, OF LOTT, TEXAS.

MILK-COOLER.

No. 930,358.   Specification of Letters Patent.   Patented Aug. 10, 1909.

Application filed April 29, 1909. Serial No. 493,033.

*To all whom it may concern:*

Be it known that I, TOMAS E. DICKSON, a citizen of the United States, residing at Lott, in the county of Falls and State of Texas, have invented certain new and useful Improvements in Milk-Coolers, of which the following is a specification, reference being had to the accompanying drawings.

This invention relates to improvements in milk coolers of that class in which cold water is allowed to drip upon porous coverings arranged on jars or other containers for the milk.

The object of the invention is to provide a simple and practical device of this character which will be simple, strong, durable and inexpensive in construction and which may be adapted to cool large or small quantities of milk or the like according to the needs of the user.

With the above and other objects in view, the invention consists of the novel features of construction and the combination and arrangement of parts hereinafter fully described and claimed, and illustrated in the accompanying drawings, in which—

Figure 1 is a perspective view of one embodiment of the invention; Fig. 2 is a vertical transverse sectional view through the same; and Fig. 3 is a similar view of a modified form of the invention which has double the capacity of that shown in Fig. 2.

The invention comprises a stand 1 on which may be placed one or more jars 2 or other containers for the milk, cream, butter or the like to be kept cool and above which is supported a cold water reservoir or tank from which the water drips upon a porous cover 3 which surrounds the jar 2. Said covering 3 is preferably in the form of a fabric bag in which the jar 2 is placed and the open top of which is brought together over a removable top 4 arranged upon the jar, as shown more clearly in Fig. 2 of the drawings. Said stand 1 preferably comprises a rectangular frame supported in a horizontal position by legs 5 and covered by a foraminous top 6 on which the jar or jars 2 are placed. Said top 6 may be made of metal gauze or of perforated metal plate, as shown, and it is also preferably covered by a strip 7 of fabric or other porous material on which the jars are placed. The waste water dripping from the foraminous or reticulate top 6 is collected by a drip pan 8 arranged between and secured to the legs 5, as shown at 9. Said drip pan is preferably of V-shape in cross section and is inclined downwardly from one end to the other end of the stand, a suitable collecting receptacle 10 being placed beneath its lower end to receive the water.

11 denotes a horizontally disposed and longitudinally extending cold water tank supported above and nearer to one side of the stand 1 by means of an elevated frame which rises from the stand. As illustrated, said frame consists of two end members each having uprights 12 13 connected at their upper ends by a cross piece 14 provided with an inwardly extending ledge 15 to receive and support one end of the tank or receptacle 4. If desired, the standards 13 may be formed by continuing the upper ends of the legs 5 on one side of the stand, as shown in Figs. 1 and 2. The tank 11 has projecting from its front side a plurality of gage cocks 16 which are so disposed that they will be over the jars 2 placed upon the top 6 of the stand. By adjusting the cocks 16 the cold water in the tank 11 may be caused to drip as fast or as slow as may be desired. Said tank 11 has a closed top in which is formed an opening 17 to receive the neck of an inverted jug or the like 18 which forms a reservoir for maintaining a constant level of water in the tank 11. If desired, the tank 11 may be filled or partially filled with ice through the opening 17 so that the water or other cooling medium will effectively chill the contents of the jars 2 as it passes through the porous coverings 3 thereon.

From the foregoing it will be seen that the invention provides an exceedingly simple device of this character which may be produced at a small cost and will be strong and durable and which is adapted to receive any number of jars of milk and jars of any size, within determined limits.

Fig. 3 of the drawings shows a device which is similar in construction and operation in all respects to that of the one shown in Figs. 1 and 2 with the exception that it is made double so as to have twice the capacity, as will be readily understood on reference to said Fig. 3.

Having thus described the invention what is claimed is:

1. A milk cooler comprising a stand having a foraminous top, a drip pan arranged in the stand beneath said top, an elevated support rising from the stand and a reservoir for cooling liquid arranged in said elevated support and having a discharge disposed over said foraminous top of the stand.

2. A milk cooler comprising a stand having a foraminous top, a drip pan arranged in the stand beneath said top, an elevated support rising from the stand, a tank arranged in said elevated support and having a closed top formed with an opening, a gage cock projecting from said tank and disposed over the foraminous top of the stand, and an inverted reservoir having a reduced end or neck projecting through the opening in the top of the tank and adapted to maintain a constant level of cooling medium therein.

3. A milk cooler comprising a stand having a foraminous top, a drip pan arranged in the stand beneath said top, an elevated support rising from the stand, a container upon said foraminous top, a closure for said container, a porous covering surrounding the container and extending over its closure and a reservoir tank for a cooling medium arranged in said elevated support and adapted to discharge its contents upon said porous covering.

4. A milk cooler comprising a stand having a rectangular body and depending supporting legs, a foraminous top upon said body, a drip pan of V-shape in cross section secured in a downwardly inclined position between the supporting legs for the stand, connected uprights rising from the body portion of the stand and having inwardly projecting supporting ledges, a longitudinally extending tank arranged on said ledges and having a closed top provided with an opening, a plurality of gage cocks projecting from said tank and disposed over the foraminous top of the stand and an inverted reservoir having a reduced end or neck projecting into the opening in the top of the tank.

In testimony whereof I hereunto affix my signature in the presence of two witnesses.

TOMAS EDWARD DICKSON.

Witnesses:
H. A. PATTON,
A. C. HENKE.